United States Patent
Schuler et al.

(10) Patent No.: US 7,681,021 B2
(45) Date of Patent: Mar. 16, 2010

(54) DYNAMIC BRANCH PREDICTION USING A WAKE VALUE TO ENABLE LOW POWER MODE FOR A PREDICTED NUMBER OF INSTRUCTION FETCHES BETWEEN A BRANCH AND A SUBSEQUENT BRANCH

(75) Inventors: Sergio Schuler, Austin, TX (US); Michael D. Snyder, Austin, TX (US); Leick D. Robinson, Round Rock, TX (US); David M. Thompson, Arlington, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 167 days.

(21) Appl. No.: 11/536,173

(22) Filed: Sep. 28, 2006

(65) Prior Publication Data

US 2008/0082843 A1 Apr. 3, 2008

(51) Int. Cl.
G06F 9/00 (2006.01)
G06F 1/32 (2006.01)
(52) U.S. Cl. .................... 712/238; 713/324
(58) Field of Classification Search ............. 712/233, 712/238, 239, 240; 713/300, 320, 324
See application file for complete search history.

(56) References Cited

U.S. PATENT DOCUMENTS 5,506,976 A * 4/1996 Jaggar ...................... 712/238
2004/0181654 A1 * 9/2004 Chen ......................... 712/239
2005/0120191 A1 * 6/2005 Akkary et al. ............. 712/217
2007/0130450 A1 * 6/2007 Chiao et al. ............... 712/239

OTHER PUBLICATIONS

Chaver, Daniel et al.; "Branch Prediction On Demand: an Energy-Efficient Solution"; International Symposium of Low Power Electronics and Design 2003; Aug. 25-27, 2003; 6 pgs.
Hu, Zhigang et al.; "Applying Decay Strategies to branch Predictors for Leakage Energy Savings"; Proceedings of IEEE International Conference on Computer Design; 2002; 4 pgs.; IEEE.
Parikh, Dharmesh et al.; "Power Issues Related to Branch Prediction"; Proceedings of Eighth International Symposium on High-Performance Computer Architecture; 2002; pp. 1-12, IEEE.
Baniasadi, Amirali et al.; "Branch Predictor Prediction: A Power-Aware Branch Predictor for High-Performance Processors"; Proceedings of the 2002 IEEE International Conference on Computer Design; 2002; 4 pgs; IEEE Computer Society.

* cited by examiner

Primary Examiner—David J Huisman
(74) Attorney, Agent, or Firm—Joanna G. Chiu; James L. Clingan, Jr.

(57) ABSTRACT

A processor has a fetch unit and a branch execution unit. The fetch unit has a branch predictor. The branch predictor has a branch target buffer and a branch direction predictor. A wake value is a number of instruction fetches that is predicted to be performed after a fetch of a branch. Thus, for a first branch, for example, a first wake number is predicted. A low power mode of the branch predictor is enabled for a duration of the first wake value in response to hit in the branch target buffer in which the hit is in response to the first branch.

10 Claims, 9 Drawing Sheets

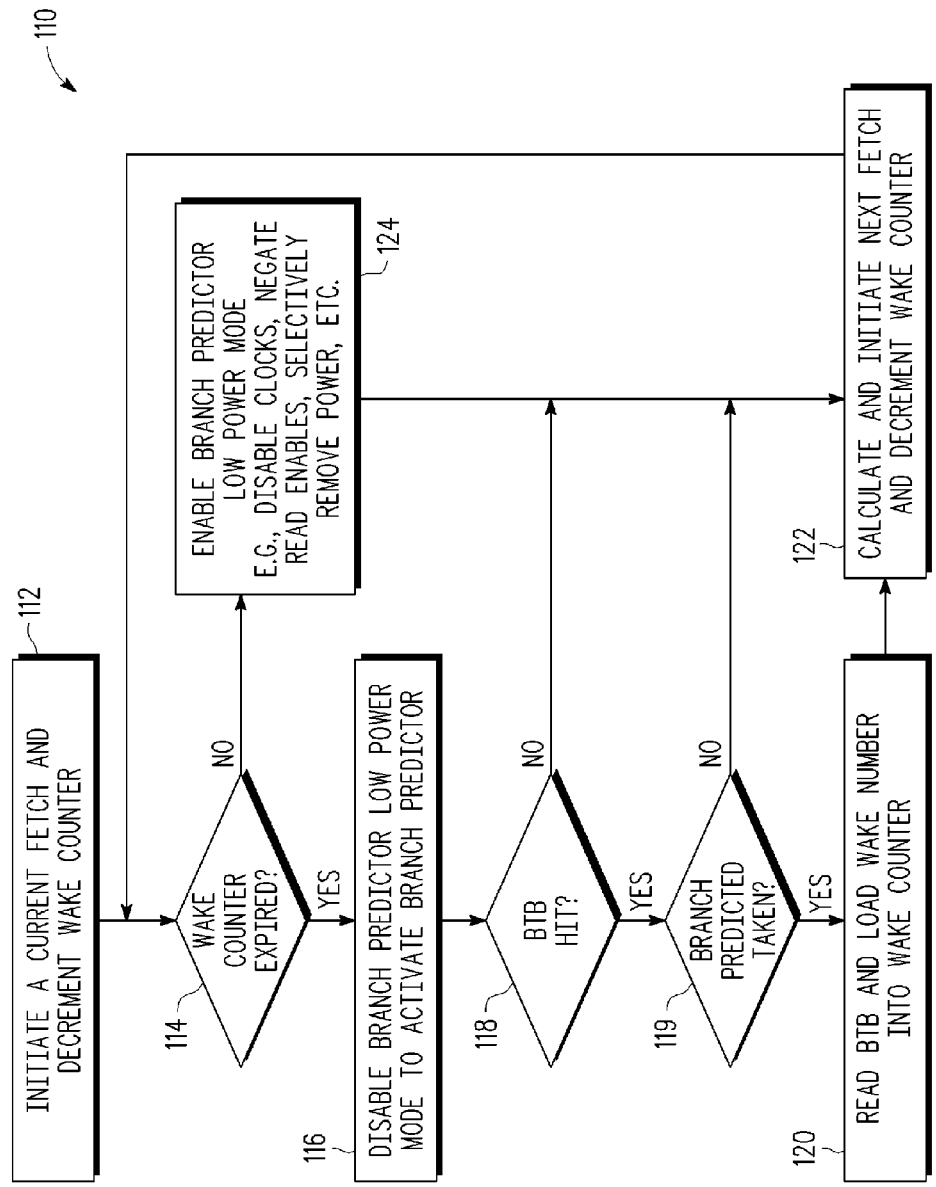

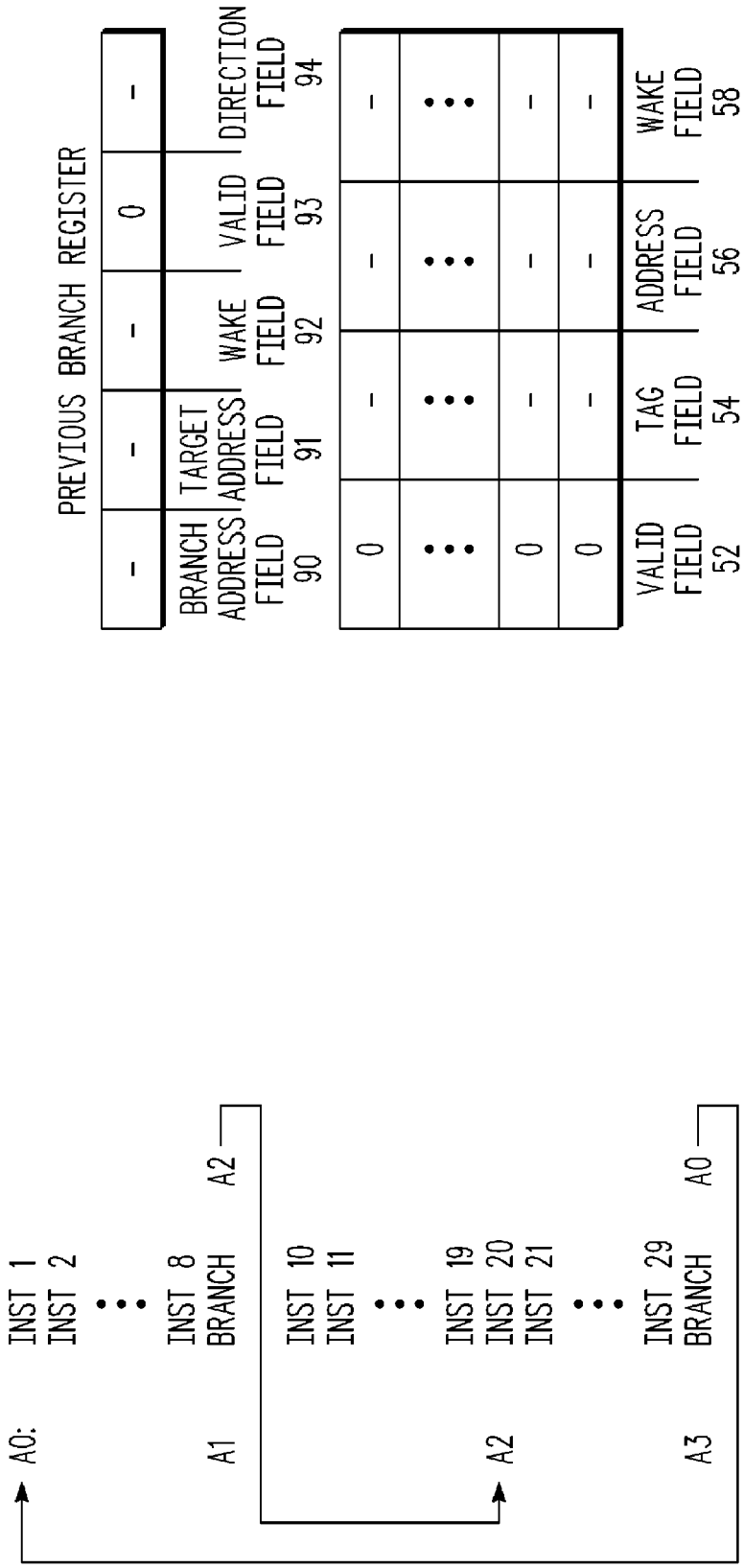

AFTER EXECUTING
BRANCH A0:

| A3 | A0 | 0 | 1 | 1 |
|---|---|---|---|---|
| BRANCH ADDRESS FIELD 90 | TARGET ADDRESS FIELD 91 | WAKE FIELD 92 | VALID FIELD 93 | DIRECTION FIELD 94 |

| 0 | — | — | — | — |
|---|---|---|---|---|
| ... | ... | ... | ... | ... |
| 1 | A3 | A0 | A0 | 0 |
| 1 | A1 | A2 | A2 | A3–A2 |
| VALID FIELD 52 | TAG FIELD 54 | ADDRESS FIELD 56 | | WAKE FIELD 58 |

FIG. 10

AFTER EXECUTING
BRANCH A2:

| A1 | A2 | 0 | 1 | 1 |
|---|---|---|---|---|
| BRANCH ADDRESS FIELD 90 | TARGET ADDRESS FIELD 91 | WAKE FIELD 92 | VALID FIELD 93 | DIRECTION FIELD 94 |

| 0 | — | — | — | — |
|---|---|---|---|---|
| ... | ... | ... | ... | ... |
| 0 | A1 | — | — | — |
| 1 | A1 | A2 | A2 | 0 |
| VALID FIELD 52 | TAG FIELD 54 | ADDRESS FIELD 56 | | WAKE FIELD 58 |

FIG. 9

AFTER EXECUTING
BRANCH A0 SECOND TIME:

PREVIOUS BRANCH REGISTER

| A3 | A0 | A1-A0 | 1 | 1 |
|---|---|---|---|---|
| BRANCH ADDRESS FIELD 90 | TARGET ADDRESS FIELD 91 | WAKE FIELD 92 | VALID FIELD 93 | DIRECTION FIELD 94 |

| 0 | ... | — | — | — |
| ... | ... | ... | ... | ... |
| 1 | A3 | — | A0 | A1-A0 |
| 1 | A1 | — | A2 | A3-A2 |
| VALID FIELD 52 | TAG FIELD 54 | ADDRESS FIELD 56 | | WAKE FIELD 58 |

FIG. 12

AFTER EXECUTING
BRANCH A2 SECOND TIME:

PREVIOUS BRANCH REGISTER

| A1 | A2 | A3-A2 | 1 | 1 |
|---|---|---|---|---|
| BRANCH ADDRESS FIELD 90 | TARGET ADDRESS FIELD 91 | WAKE FIELD 92 | VALID FIELD 93 | DIRECTION FIELD 94 |

| 0 | ... | — | — | — |
| ... | ... | ... | ... | ... |
| 1 | A3 | — | A0 | A1-A0 |
| 1 | A1 | — | A2 | A3-A2 |
| VALID FIELD 52 | TAG FIELD 54 | ADDRESS FIELD 56 | | WAKE FIELD 58 |

FIG. 11

AFTER EXECUTING
BRANCH A2, THIRD TIME:

PREVIOUS BRANCH REGISTER

| BRANCH ADDRESS FIELD 90 | TARGET ADDRESS FIELD 91 | WAKE FIELD 92 | VALID FIELD 93 | DIRECTION FIELD 94 |
|---|---|---|---|---|
| A1 | A2 | A3-A2 | 1 | 1 |

| VALID FIELD 52 | TAG FIELD 54 | ADDRESS FIELD 56 | WAKE FIELD 58 |
|---|---|---|---|
| 0 | – | – | – |
| ... | ... | ... | ... |
| 1 | A3 | A0 | A1-A0 |
| 1 | A1 | A2 | A3-A2 |

*FIG. 13*

DYNAMIC BRANCH PREDICTION USING A WAKE VALUE TO ENABLE LOW POWER MODE FOR A PREDICTED NUMBER OF INSTRUCTION FETCHES BETWEEN A BRANCH AND A SUBSEQUENT BRANCH

FIELD

The present invention relates generally to data processing systems, and more specifically, to dynamic branch prediction predictors.

RELATED ART

Many data processing systems today utilize branch prediction to improve processor performance by reducing the number of cycles spent in execution of branch instructions. Many branch predictors also include branch target buffers (BTBs) which act as a cache of recent branches and can accelerate branches by providing a branch target address (address of the branch destination) prior to execution of the branch instruction, which allows a processor to more quickly begin execution of instructions at the branch target address. While branch prediction may help improve performance, branch prediction does consume power. Power consumption is a growing concern in data processing systems. For example, reduction in power consumption can lead to increased battery life for embedded devices or can provide for larger computation power to exist within a given thermal envelope.

BRIEF DESCRIPTION OF THE DRAWINGS

The present invention is illustrated by way of example and not limited by the accompanying figures, in which like references indicate similar elements, and in which:

FIG. 6 illustrates, in flow diagram form, a method for enabling and disabling a branch predictor low power mode, in accordance with one embodiment of the present invention;

FIG. 7 illustrates a sample section of code, in accordance with one embodiment of the present invention; and FIGS. 8-13 illustrate various time snapshots of the previous branch register of FIG. 5 and the branch target buffer of FIG. 3 or 4 during execution of the section of code of FIG. 7, in accordance with one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

One embodiment allows for reduced power consumption by selectively enabling and disabling a low power mode of the branch predictor. For example, each time the branch target buffer (BTB) is accessed and a branch is predicted, power is consumed; therefore, by disabling the branch predictor when branch prediction is not needed, power consumption can be reduced. For example, if a sequence of fetched instructions does not include branch instructions, then the branch predictor can be disabled during the fetching of that sequence of instructions. For example, in one embodiment, a wake value is predicted which represents a predicted number of instruction fetches that can be performed after the fetch of a branch instruction in which there are no branch instructions which reside in the BTB. Therefore, each time a branch outcome is predicted by the branch predictor, the branch predictor can be disabled for the duration of the wake value to reduce power.

Figure 1:
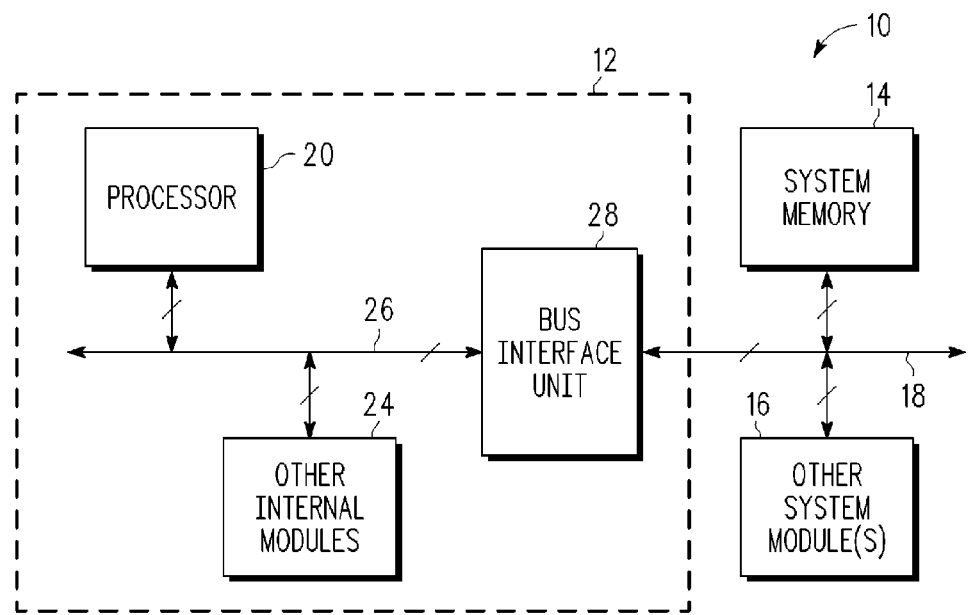
FIG. 1 illustrates, in block diagram form, a data processing system in accordance with one embodiment of the present invention.

Referring to FIG. 1, in one embodiment, a data processing system 10 includes an integrated circuit 12, a system memory 14 and one or more other system module(s) 16. Integrated circuit 12, system memory 14 and one or more other system module(s) 16 are connected via a multiple conductor system bus 18. Other system module(s) 16 and other internal modules 24 may include any type of modules such as peripherals, input/output (I/O) circuits, memories, etc. Alternatively, other system modules or internal modules may not be present at all. System memory 14 can be any type of memory including random access memory (RAM), non-volatile memory (e.g. Flash), read only memory (ROM), etc. Within integrated circuit 12 is a processor 20 that is coupled to a multiple conductor internal bus 26 (which may also be referred to as a communication bus). Also connected to internal bus 26 are other internal modules 24 and a bus interface unit 28. Bus interface unit 28 has a first multiple conductor input/output terminal connected to internal bus 26 and a second multiple conductor input/output terminal connected to system bus 18. In an alternate embodiment, BIU 28 may be included within processor 20. Processor 20 can be any type of processor, such as, for example, a microprocessor, a digital signal processor, a microcontroller, etc. It should be understood that data processing system 10 is exemplary. Other embodiments include all of the illustrated elements on a single integrated circuit or variations thereof. In other embodiments, only processor 20 may be present. Furthermore, in other embodiments data processing system 10 may be implemented using any number of integrated circuits.

In operation, integrated circuit 12 performs predetermined data processing functions where processor 20 executes processor instructions, including conditional and unconditional branch instructions, and utilizes the other illustrated elements in the performance of the instructions, as needed. As will be described below, processor 20 includes a branch predictor which can be selectively placed in low power mode.

Figure 2:
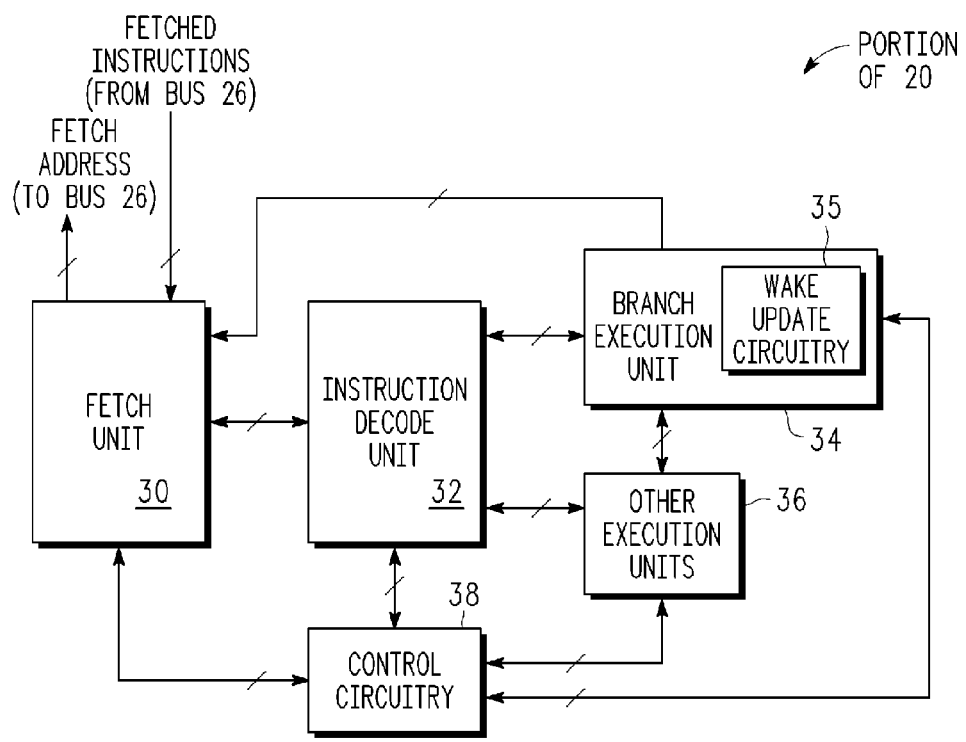
FIG. 2 illustrates, in block diagram form, a portion of a processor of FIG. 1 in accordance with one embodiment of the present invention.

FIG. 2 illustrates a portion of processor 20 in accordance with one embodiment of the present invention. Processor 20 includes a fetch unit 30, an instruction decode unit 32, a branch execution unit 34, other execution units 36, and control circuitry 38. Control circuitry 38 is bidirectionally coupled to fetch unit 30, instruction decode unit 32, branch execution unit 34, and other execution units 36. Fetch unit 30 provides fetch addresses to bus 26 and receives fetched instructions from bus 26, is bidirectionally coupled to instruction decode unit 32, and receives information from branch execution unit 34. Instruction decode unit 32 is bidirectionally coupled to branch execution unit 34 and other execution units 36. Branch execution unit 34 includes wake update circuitry 35 and is bidirectionally coupled to other execution units 36.

Control circuitry 38 includes circuitry to coordinate, as needed, the fetching, decoding, and execution of instructions. Fetch unit 30 provides fetch addresses to a memory, such as system memory 14, and in return, receives data, such as fetched instructions, where these instructions are then provided to instruction decode unit 32 for decoding. After decoding, each instruction gets executed accordingly by branch execution unit 34 and other execution units 36. Operation of instruction decode unit 32, other execution units 36, and branch execution unit 34 (except for portions related to and including wake update circuitry 35) may operate as known in the art, and therefore, details of these units will be provided herein only to the extent helpful in describing the embodiments described herein. Operation of fetch unit 30 and wake update circuitry 35 will be described in more detail in reference to FIGS. 3-13 below.

Figure 3:
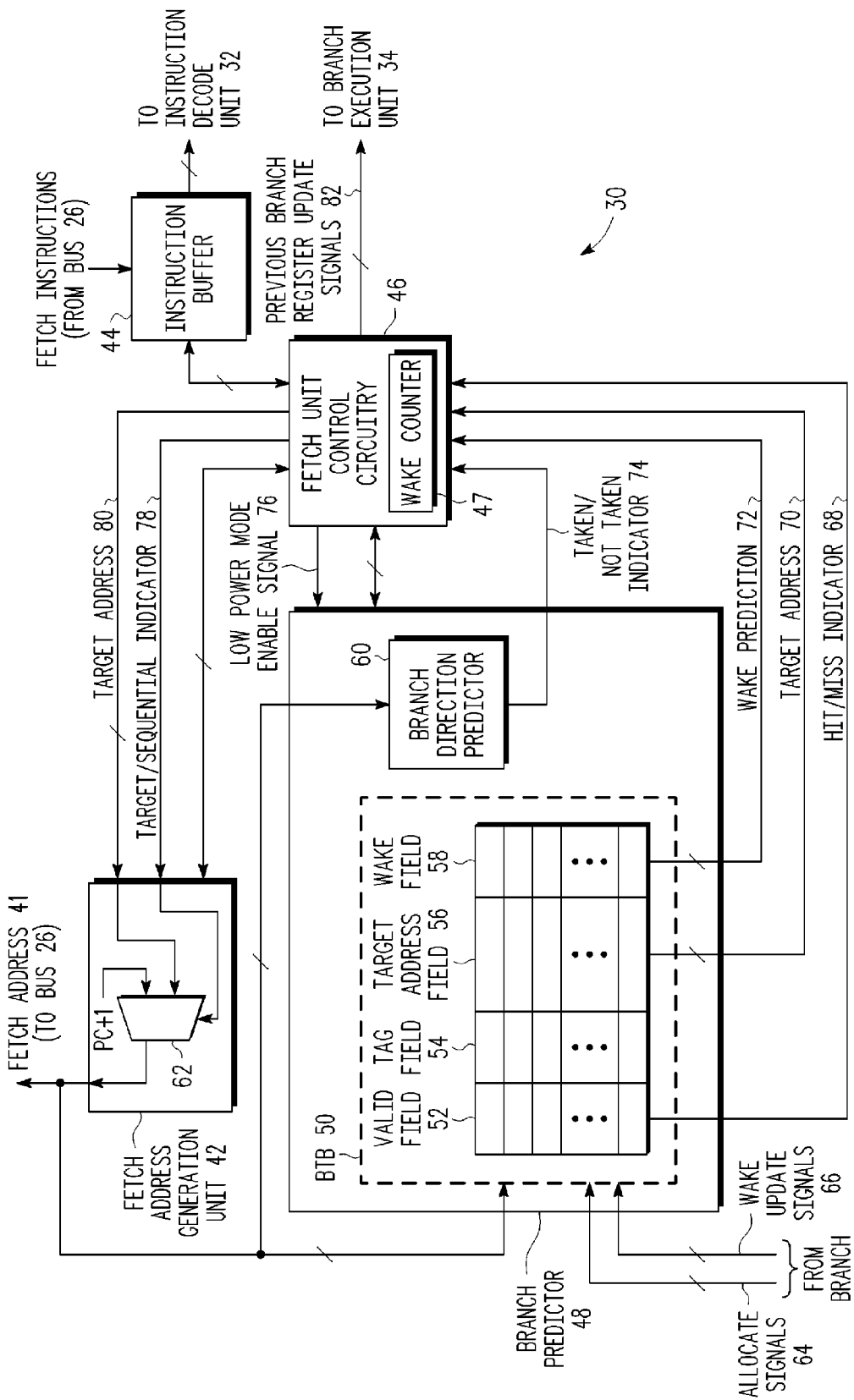
FIG. 3 illustrates, in block diagram form, the fetch unit of the processor of FIG. 2, in accordance with one embodiment of the present invention.

FIG. 3 illustrates a more detailed view of fetch unit 30 in accordance with one embodiment. Fetch unit 30 includes a fetch address generation unit 42, a branch predictor 48, fetch unit control circuitry 46, and an instruction buffer 44. Fetch unit control circuitry 46 includes a wake counter 47 and is bidirectionally coupled to each of fetch address generation unit 42, branch predictor 48, and instruction buffer 44. Fetch address generation unit 42 includes a multiplexer (MUX) 62 which receives an incremented value of the program counter (PC+1) as a first input, a target address 80 from fetch unit control circuitry 46 as a second input, and a target/sequential indicator 78 from fetch unit control circuitry 46 as a control input, and provides fetch addresses to bus 26 via fetch address 41. Instruction buffer 44 receives fetched instructions from bus 26 and provides the fetched instructions to instruction decode unit 32.

Branch predictor 48 includes a branch target buffer (BTB) 50 and a branch direction predictor 60. BTB 50 includes storage circuitry which includes a number of entries, each entry having a valid field 52, a tag field 54, a target address field 54, and a wake field 58. BTB 50 also includes circuitry (not illustrated), as known in the art, to search BTB 50, read information from BTB 50, and store data to BTB 50. BTB 50 receives fetch address 41 from fetch address generation unit 42 and receives allocate signals 64 and wake update signals 66 from branch execution unit 34. BTB 50 also provides a hit/miss indicator 68, a target address 70 and a wake prediction 72 to fetch unit control circuitry 46. Branch direction predictor 60 receives fetch address 41 and provides a taken/not taken indicator 74 to fetch unit control circuitry 46.

Fetch unit control circuitry 46 provides a low power mode enable signal 76 to branch predictor 48 and previous branch register update signals 82 to branch execution unit 34. Low power mode enable signal 76 may be used in a variety of ways to activate a low power mode of branch predictor 48. For example, in one embodiment, low power mode enable signal 76 may be used to disable or gate clocks provided to branch predictor 48, to disable read accesses or negate read enables within branch predictor 48, to selectively remove power from all or portions of branch predictor 48, etc., or may be used to perform combinations thereof. The types of circuitry to perform these functions in response to low power mode enable signal 76 are known in the art, and therefore, will not be illustrated in more detail herein.

In operation, fetch addresses are generated by fetch address generation unit 42, where fetch address generation unit 42 either provides a sequential fetch address to the previous fetch address or provides a target address as fetch address 41 to bus 26. That is, fetch address 41 may either be sequential or not sequential to a previous fetch address, where MUX 62 outputs either a sequential address, represented by the "PC+1" where PC refers to the program counter value, or a target address based on a MUX selector signal. Fetch address 41 is provided via bus 26 to a memory, such as, e.g., system memory 14, in order to fetch another instruction. The fetched instructions received from the memory, via bus 26, are provided to instruction buffer 44 which provides the fetched instructions to instruction decode unit 32. Instruction decode unit 32 then decodes the received instructions, and branch execution unit 34 and other execution units 36 are used to execute the decoded instructions.

Each generated fetch address 41 is also provided to branch predictor 48. Fetch address 41 is provided to both BTB 50 and branch direction predictor 60. A search is performed to determine whether fetch address 41 hits in BTB 50. That is, if fetch address 41 matches a valid entry in BTB 50, then hit/miss indicator 68 is asserted to indicate a BTB hit has occurred. However, if fetch address 41 does not match a valid entry in BTB 50, then hit/miss indicator 68 is not asserted (e.g. negated) to indicate that a BTB miss has occurred. When fetch address 41 hits in BTB 50, it is assumed that fetch address 41 corresponds to a branch instruction address. Note that BTB 50 operates as a cache of most recent branches. Therefore, if fetch address 41 hits in BTB 50, in addition to providing an asserted hit/miss indicator 68, BTB 50 also provides a corresponding target address 70 which is stored in the corresponding target address field 56 of the matched BTB entry. In addition, fetch address 41 is also provided to branch direction prediction 60 which determines whether or not a branch corresponding to fetch address 41 should be predicted taken or not taken, and asserts or negates taken/not taken indicator 74 accordingly.

Hit/miss indicator 68, target address 70, and taken/not taken indicator 74 are all provided to fetch unit control circuitry 46 which determines whether target address 70 should be provided as the next fetch address or whether a sequential fetch address should be provided as the next fetch address. For example, if hit/miss indicator 68 indicates a miss occurred, then fetch unit control circuitry 46 sets target/sequential indicator 78 to select the PC+1 input of MUX 62 to be provided as the next fetch address to be provided by fetch address generation unit 42. That is, since fetch address 41, in this case, did not hit in BTB 50, there is no indication as to whether fetch address 41 corresponds to a branch instruction or not, so the next sequential address is fetched. However, if hit/miss indicator 68 indicates a hit occurred in BTB 50, then fetch unit control circuitry 46 sets target/sequential indicator 78 based on taken/not taken indicator 74. That is, since a hit occurred, it is assumed that fetch address 41 corresponds to a branch instruction having a target address indicated by target address 70. Based on whether the branch instruction assumed to be stored at fetch address 41 is predicted to be taken or not taken, either a sequential address or target address 70 will be provided as the next fetch address. Therefore, if taken/not taken indicator 74 indicates a taken prediction, then fetch unit control circuitry 46 sets target/sequential indicator 78 to allow MUX 62 to select target address 80, where the value of target address 80 is the same as target address 70. Therefore, fetch address generation unit 42 provides target address 80 (i.e. the value of target address 70) as the next fetch address. However, if taken/not taken indicator 74 indicates a not taken prediction, then fetch unit control circuitry 46 sets target/sequential indicator 78 to allow MUX 62 to select the input corresponding to a sequential fetch address (i.e. "PC+1").

Note that, in the illustrated embodiment, it is assumed that fetch addresses are provided corresponding to a single instruction, therefore, for sequential addresses, the PC is incremented by 1 to point to the next instruction within the memory being fetch from. However, in alternate embodiments, a fetch address can fetch a group of instructions (i.e. multiple instructions with each fetch address), where, in this embodiment, a next sequential fetch address may require incrementing the PC by the number of instructions fetched with each group.

Note also, that in an alternate embodiment, branch direction predictor 60 may not be present. In this embodiment, if a fetch address hits in BTB 50, then it is not only assumed that the fetch address corresponds to a branch instruction, but it is also predicted as a taken branch. That is, anytime a fetch address bits in BTB 50, then target address 70 is always provided (via target address 80 and MUX 62) as the next fetch address following the fetch address that hit in BTB 50. In yet another alternate embodiment, a corresponding field to each entry within BTB 50 may indicate whether a particular valid entry is to be predicted as taken or not taken upon a hit of that BTB entry.

In alternate embodiments, note that any circuitry can be used within fetch address generation 42 which provides either a target address or a sequential address, based on target/sequential indicator 78, as fetch address 41. Also, any known branch direction prediction circuitry or logic can be used to implemented branch direction prediction 60.

In one embodiment, an entry in BTB 50 is allocated each time a branch instruction is taken. That is, when an instruction is decoded by instruction decode unit 32 as a branch instruction and branch execution unit 34 resolves the branch instruction as a taken branch, an entry in BTB 50 is allocated for that taken branch and marked as valid. For example, the valid field for the entry is asserted to indicate that it is a valid entry, the tag field is set based on the branch instruction address of the taken branch instruction, and the target field is set to the target of the taken branch instruction. (Note that the wake field will be discussed below.) Note that BTB allocation, and the update of valid field 52, tag field 54, and target address field 56 may be performed as known in the art. This information (including an indication as to whether or not an entry should be allocated) may be provided via allocate signals from branch execution unit 34. If BTB 50 is full and a new entry is to be allocated, note that any known algorithm may be used to determine which entry to replace (e.g. a round robin algorithm may be used, a least recently used algorithm may be used, etc.) Also, note that some of this information or other information may be provided to branch direction predictor 60, as needed, to update its branch prediction algorithm.

Still referring to FIG. 3, note that each entry in BTB 50 also includes a corresponding wake number stored in wake field 58. When fetch address 41 hits in BTB 50 and hit/miss indicator 68 is asserted to indicate a hit, then, in addition to providing target address 70, BTB 50 provides the wake number from the corresponding wake field as wake prediction 72. This wake prediction 72 is provided to fetch unit control circuitry 76, where, in response to wake prediction 72, hit/miss indicator 68, and taken/not taken indicator 74, fetch unit control circuitry 76 controls low power mode enable signal 76 (thus controlling the enabling and disabling of a low power mode of branch predictor 48). The wake number provided as wake prediction 72 indicates a number of subsequent instruction fetches. The wake number represents a prediction of how many subsequent fetches, after a taken branch, will not include a branch instruction (i.e. a prediction of how many fetches occur between the target of the taken branch and an immediately following branch after the target). If it is predicted that for a wake number of subsequent instruction fetches following the target of a fetched branch instruction which hit in BTB 50, a branch instruction will not be fetched, then branch predictor 48 can be disabled for that wake number of fetches. In this manner, by allowing branch predictor 48 to be disabled or in a low power mode for a particular number of subsequent instruction fetches, power can be conserved.

Therefore, in one embodiment, upon fetch address 41 hitting in BTB 50 (indicated by hit/miss indicator 68) and the branch being predicted taken (indicated by taken/not taken indicator 74 in the illustrated embodiment), wake counter 47, if expired (e.g. equal to zero), is loaded with the value of wake predictor 72. With the generation of each subsequent fetch address, wake counter 47 is decremented, and while wake counter 47 is not expired, fetch unit control circuitry 76 asserts (or continues to assert) low power mode enable signal 76 to maintain branch predictor 48 disabled. Once wake counter 47 has expired, low power mode enable signal 76 is deasserted so that branch predictor 48 is enabled. Branch predictor 48 remains enabled until a next hit in BTB 50 occurs with a branch taken prediction and with a corresponding wake number of greater than zero.

Operation of how wake prediction 72 is used can be better understood in reference to flow 110 of FIG. 6. Flow 110 begins with block 112 in which a current fetch is initiated (e.g. fetch address generation unit 42 provides a fetch address) and wake counter 47, if not already expired, is decremented. Flow then proceeds to decision diamond 114 where it is determined if wake counter 47 is expired. If not (e.g., if wake counter 47 is still greater than zero), flow proceeds to block 124 where a low power mode of branch predictor 48 is enabled. That is, in the illustrated embodiment, fetch unit control circuitry 46 asserts low power mode enable signal 76 such that, in response, branch predictor 48 enters or is maintained in a low power mode. As discussed above, a lower power mode of branch predictor 48 or a disabling of branch predictor 48 can be achieved in a variety ways, such as, for example, by disabling or gating clocks, negating read enables, removing power from all or portions of branch predictor 48, etc. After block 124, flow proceeds to block 122 where a next fetch is calculated and initiated, and wake counter 47 is decremented. In the illustrated embodiment, the next fetch is calculated and initiated by fetch address generation unit 42 providing either PC+1 or target address 80 as the next fetch address based on target/sequential indicator 78, as was already described above. Flow then returns to decision diamond 114.

If, at decision diamond 114, wake counter 47 has not expired, flow proceeds to block 116 where the low power mode of branch predictor 48 is disabled in order to activate branch predictor 48 (or maintain branch predictor 48 activated). That is, in the illustrated embodiment, fetch unit control circuitry 46 deasserts or negates low power mode enable signal 76 such that, in response, branch predictor 48 is activated (or is maintained activated). Flow then proceeds to decision diamond 118 where it is determined if the current fetch address results in a BTB hit. If not, flow proceeds to block 122. However, if so, flow proceeds to decision diamond 119 where it is determined whether the BTB hit also corresponds to a branch taken prediction. If not, flow proceeds to block 122. However, if so, flow proceeds to block 120 where the wake number from the corresponding entry in BTB 50 that resulted in the hit is provided as wake prediction 72 to fetch unit control circuitry 46. This wake number is then loaded into wake counter 47. Flow then proceeds to block 122. Therefore, as was discussed above, upon a hit in BTB 50 and a corresponding branch taken prediction, branch predictor 48 can be disabled for a predicted wake number of subsequent fetches in order to conserve power.

Note that in the illustrated embodiment, the wake number from the corresponding wake field of the entry on which the hit occurred is used to enable a low power mode of branch predictor 48 and used to update wake counter 47 only when the address which hit in BTB 50 is also predicted as a taken branch. In an alternate embodiment, each wake field 58 may include both a taken wake number and a not taken wake number, and BTB 50 would then provide both a taken wake prediction signal and a not taken wake prediction signal to fetch unit control circuitry 46 in response to a hit in BTB 50. In this embodiment, the taken wake number is used to disable branch predictor 48 for a subsequent number of fetches following the branch if predicted taken (as was described in reference to FIG. 6), and the not taken wake number can be used to disable branch predictor 48 for a subsequent number of fetches following the branch if predicted not taken. In this case, in block 120 of FIG. 6, the taken wake number provided by the taken wake prediction signal from BTB 50 would be used to load wake counter 47. However, in this case, on the "no" branch from decision diamond 119, the not taken wake number provided by the not taken wake prediction signal from BTB 50 would be used to load wake counter 47, prior to flow continuing to block 122. However, for ease of explanation herein, the wake number will refer to a taken wake number, i.e. a predicted number of subsequent fetches occurring after a predicted taken branch that do not include a branch instruction.

Figure 4:
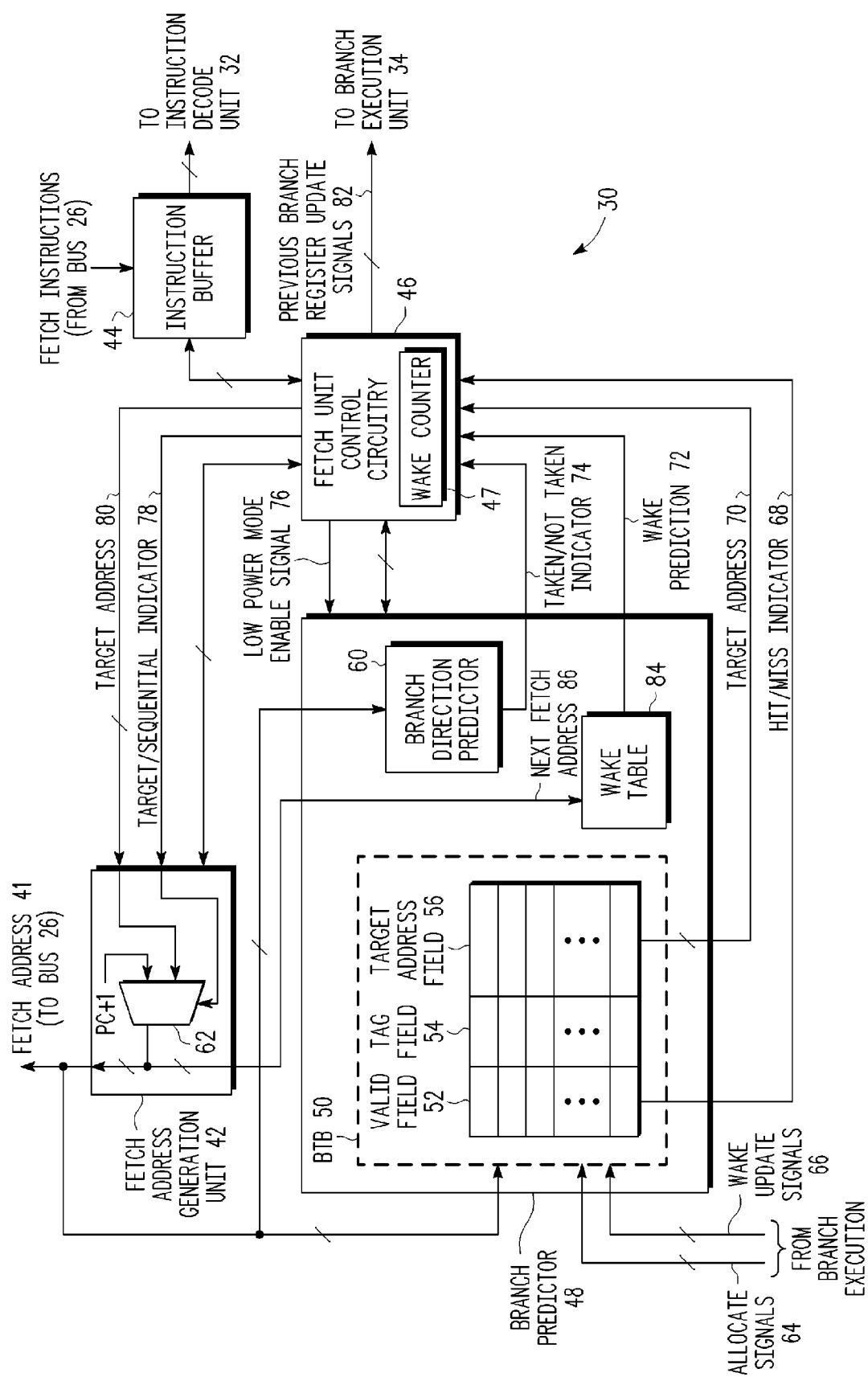
FIG. 4 illustrates, in block diagram form, the fetch unit of the processor of FIG. 2, in accordance with another embodiment of the present invention.

FIG. 4 illustrates a more detailed view of fetch unit 30 in accordance with an alternate embodiment, in which like numerals are used to indicate like elements. Therefore, many of the descriptions and discussions provided above with respect to FIGS. 3 and 6 also apply to FIG. 4. In the embodiment of FIG. 4, BTB 50 does not include a wake field for each entry, as was the case in FIG. 3. Instead, branch predictor 48 includes a wake table 84 which receives the output of MUX 62, which is referred to as next fetch address 86, and provides wake prediction 72 to fetch unit control circuitry 46. Note that next fetch address 86 is the same signal as fetch address 41, but corresponds to the next fetch address generated after current fetch address 41. Wake table 84 includes a number of wake values which correspond to different target addresses. Therefore, rather than each tag in BTB 50 (which is derived from the branch instruction addresses) having a corresponding wake number, each target address has a corresponding wake number.

Therefore, in the illustrated embodiment, once fetch unit control circuitry 46 receives a hit indication via hit/miss indicator 68, and a taken indication via taken/not taken indicator 74, fetch unit control circuitry 46 provides target/sequential indicator 78 to MUX 62 to select target address 80 as the next fetch address, and it is this next fetch address (i.e. the predicted target of the branch address which hit in TB 50) that is used to select a corresponding wake value to provide via wake prediction 72 to be used in updating wake counter 47 and control the enabling or disabling of a low power mode of branch predictor 48. Note that when branch predictor 48 is in a low power mode, wake table 84 is also in low power mode, since it is contained as part of branch predictor 48. Note that in the illustrated embodiment in which a wake value is provided in response to a taken branch, wake table 84 may receive target address 70 or target address 80 directly rather than next fetch address 86 at the output of MUX 62 in order to provide the corresponding wake number as wake prediction 72.

Therefore, as described in reference to the illustrated embodiment of FIG. 3, a wake number is provided to update wake counter 47 in response to a fetch instruction which hits and is predicted taken. Alternatively, wake table 84 may store one or both of a taken wake number and a not taken wake number for each address, where each address is a next fetch address following a branch instruction (where this next fetch address can either be a target address of the branch instruction or a subsequent address of the branch instruction, in the case where the branch is predicted not taken). Therefore, in this embodiment, wake table 84 would output a taken wake prediction and a not taken wake prediction, where the taken wake number would be provided as the taken wake prediction in the case of a hit in BTB 50 and a taken prediction while the not taken wake number would be provided as the not taken wake prediction in the case of a hit in BTB 50 and a not taken prediction. These taken or not taken wake predictions would then be used to update wake counter 47, as was described above. Also, note that in this embodiment, target address 70 or target address 80 could not be provided directly to wake table 84 instead of next fetch address 86 because in the case of a not taken branch, the next fetch address which would be used to address the proper not taken wake number in wake table 84 would correspond to PC+1 (the next sequential address) and not target address 80.

As discussed above, the wake number, as used herein, indicates a prediction of how many subsequent fetches after a taken branch do not include a branch instruction. Determination of this predicted wake value can be performed by wake update circuitry 35 which may be located within branch execution unit 34. For example, if the wake value of one of a wake field 58 in BTB 50 needs to be updated with a new wake number, wake update circuitry 35 sends both a wake update value 98 indicating the new wake value and a wake update index 100 indicating a branch address so that the appropriate entry in BTB 50 can be indexed (for, e.g., the embodiment of FIG. 3) or a next fetch address so that the appropriate entry in wake table 84 can be indexed (for, e.g., the embodiment of FIG. 4). The process for updating the wake values can be better understood in reference to FIG. 5 and FIGS. 7-13.

Figure 5:
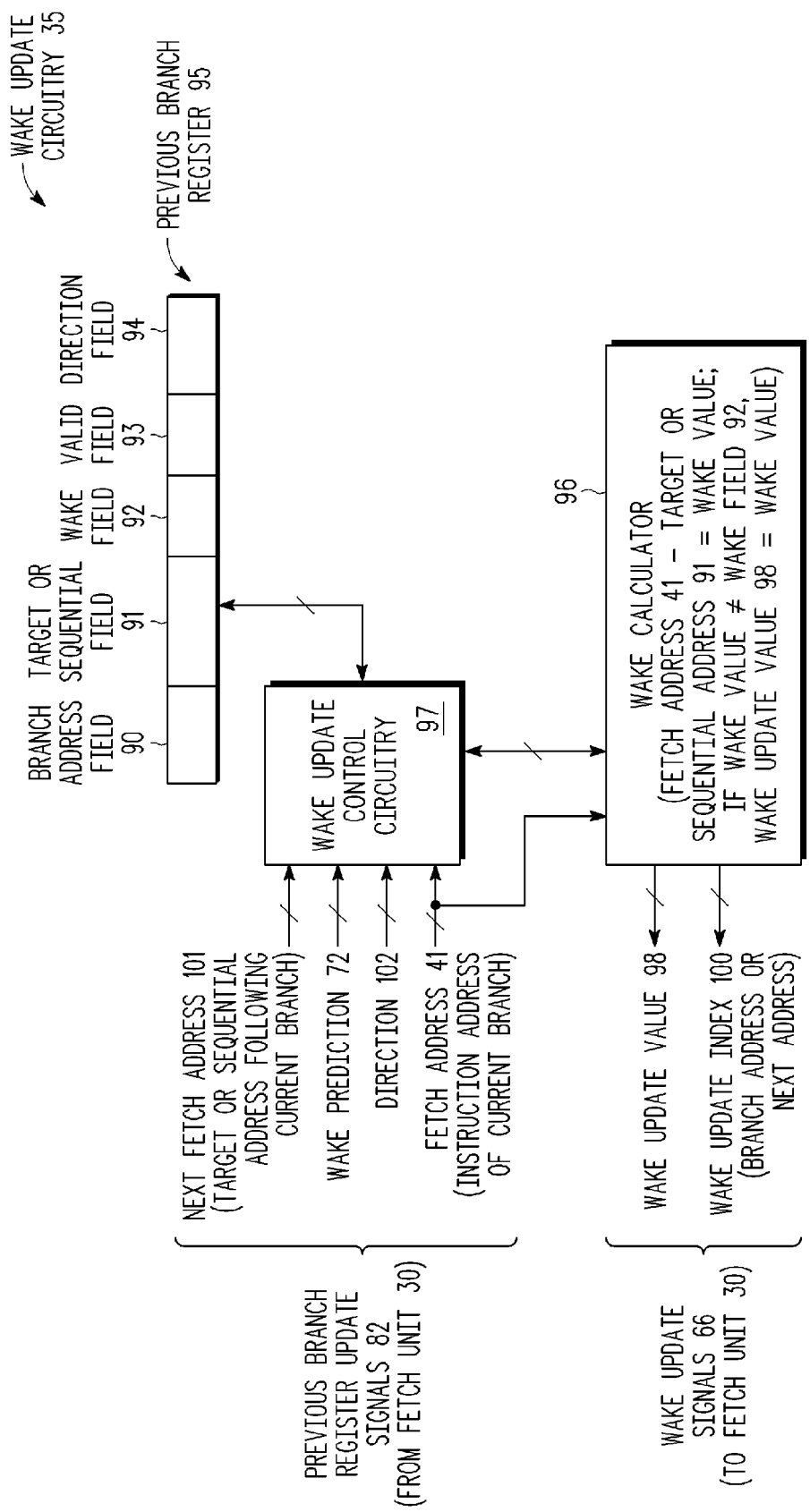
FIG. 5 illustrates, in flow diagram form, the wake update circuitry of the branch execution unit of the processor of FIG. 2, in accordance with one embodiment of the present invention.

FIG. 5 illustrates a more detailed view of wake update circuitry 35, in accordance with one embodiment. Wake update circuitry 35 includes a previous branch register 95, wake update control circuitry 97, and wake calculator 96.

Wake update control circuitry is bidirectionally coupled to previous branch register 95 and wake calculator 96.

Previous branch register 95 stores information about a previous branch instruction. In the illustrated embodiment, the previous branch instruction is a branch instruction that occurred immediately previous to the current branch instruction being executed. (However, in alternate embodiments, it may not be the immediately previous branch instruction.) In the illustrated embodiment, previous branch register 95 includes a branch address field 90 which stores the instruction address of the previous branch instruction, a target or sequential address field 91 which stores the fetch address that occurred subsequent to the fetch of the previous branch instruction (which would be the target of the previous branch instruction if the previous branch instruction was a taken branch or a sequential address to the address of the previous branch instruction if the previous branch instruction was a not taken branch), a wake field 92 which stores the wake value that corresponds to the previous branch instruction (it may correspond to the wake value stored in BTB 50 or wake table 84, depending on the implementation), a valid field 93 which indicates whether the information in previous branch register 95 is valid, and a direction field 94 which indicates whether the previous branch instruction was a taken or not taken branch. Initialization and use of previous branch register 95 will be further described in reference to the example of FIGS. 7-13.

Note that in the illustrated embodiment, a register is used to store information for the previous branch instruction. However, in alternate embodiments, due to the pipelined nature of processor 20, a first-in first-out (FIFO) storage mechanism may be used to store information regarding previous branch instructions. Therefore, note that previous branch register 95 may also be referred to as a FIFO, where in the illustrated embodiment of FIG. 5, previous branch register 95 is a single entry FIFO, for ease of explanation.

Wake update control circuitry 97 receives various previous branch register update signals 82 from fetch unit 30. These may include fetch address 41 (which corresponds to the instruction address of the current branch being executed by branch execution unit 34), a next fetch address 101 (corresponding to the output of MUX 62 based on fetch address 41 where the next fetch address to fetch address 41 can either be a target address associated with fetch address 41 or an address sequential to fetch address 41 if fetch address 41 did not hit in BTB 50 or if fetch address did hit but was predicted not taken), wake prediction 72, and direction 102 which indicates whether the current branch was predicted taken or not taken. Note that in alternate embodiments, more or less information may be provided from fetch unit 30 to branch execution unit 34.

Wake calculator 96 receives fetch address 41 (the instruction address of the current branch instruction) and, using fetch address 41 as well as the information stored in previous branch register 95 which is communicated to wake calculator 96 by wake update control circuitry 97, determines whether the wake value for the current branch instruction should be updated and if so, with what value. (In an alternate embodiment, note that wake calculator 96 can be directly coupled to previous branch register 95 to obtain the information needed.) Wake calculator 96 computes "fetch address 41–target or sequential address 91" to determine a wake value. Wake calculator 96 then determines if this wake value is equal or not to the value in wake field 93, and if they are not equal, then wake calculator provides the calculated wake value as wake update value 98 back to fetch unit 30 so that wake field 58 of BTB 50 or wake table 84 can be updated appropriately. Note that this wake value corresponds to the new wake value for the previous branch instruction whose information is stored in previous branch register 95. Therefore, wake calculator 96 also provides wake update index 100 to indicate to fetch unit 30 which wake value to update with the new wake value. For example, wake update index 100 may be the value of branch address field 90 such that wake field 58 of the appropriate entry in BTB 50 (corresponding to the previous branch instruction) can be updated with the new wake value (as in the embodiment of FIG. 3). Alternatively, wake update index 100 may be the value of target or sequential address field 91, such that the appropriate entry in wake table 84 can be updated with the new wake value (as in the embodiment of FIG. 4). In this manner, the wake value corresponding to the previous branch instruction represents how many instruction fetches occurred from the target of the previous branch instruction to the immediately following next branch instruction (which corresponds to the current branch instruction stored at fetch address 41 in the embodiment of FIG. 5). Operation will be further described in reference to FIGS. 7-13.

FIG. 7 illustrates a code segment including two branch instructions and multiple other instructions (inst 1-inst 29). The first branch instruction is branch A2 which, upon being taken, branches to inst 20, and the second branch instruction is branch A0 which, upon being taken, loops back to inst 1 (i.e. branches back to inst 1). In the current example, it will be assumed that each time branch A2 and branch A0 are executed, they are taken. Note that A0 represents the instruction address for inst 1, A1 represents the instruction address for branch A2, A2 represents the instruction address for inst 20, and A3 represents the instruction address for branch A0. FIGS. 8-13 will follow execution of the code segment of FIG. 7, indicating how the fields of previous branch register 95 are updated and how entries in BTB 50 (of the embodiment of FIG. 3) are allocated and/or updated. Note that the examples also apply to the embodiment of FIG. 4 where the wake values would be updated within wake table 84 rather than BTB 50.

FIG. 8 illustrates the state of previous branch register 95 and BTB 50 prior to executing inst 1. It is assumed that everything is cleared or invalid at this point in time, and this is the first time executing the code segment. Note that valid field 93 is initialized to zero to indicate that it and its entries are currently invalid. Similarly, note that valid field 52 for each entry in BTB 50 is set to zero to indicate that there are currently no valid entries in BTB 50.

FIG. 9 illustrates the state of previous branch register 95 and BTB 50 after executing the first branch instruction, branch A2. Since branch A2 is taken, an entry in BTB 50 is allocated for branch A2. Therefore, an entry in BTB 50 is allocated by setting its valid field 52 to one to indicate a valid entry, storing the address of the branch A2 instruction, A1, or a value derived from A1 into the tag address field, and by storing A2 in the target field. Also, since branch A2 is the first branch encountered, no wake value is calculated because previous branch register 95 still has no valid entry (i.e. because no previous branch has been executed). Prior branch register 95 is then validated with branch A2. That is, the branch address of branch A2, which is A1, is stored in branch address field 90, the target or sequential address following A1 (which is the target, A2, of branch A2 in this case since the branch was taken) is stored in target or sequential field 91, a value of one is stored in direction field 94 to indicate that the branch is taken, a value of one is stored in valid field 93 to indicate that the values in previous branch register 95 are valid, and a zero is stored in wake field 92 to indicate that an actual wake value has yet to be determined. Note that the direction value in direction field 94 indicates whether the branch stored in register 95 was actually taken or not (not just predicted taken or not taken) because at this point, branch execution unit 34 is executing this branch and resolves the condition to determine whether it is actually take or not. Also, note that an entry is allocated in BTB 50 for branch A2 once it is determined by branch execution unit 34 that it is an actually taken branch.

FIG. 10 illustrates the state of previous branch register 95 and BTB 50 after executing the second branch instruction, branch A0. Since branch execution unit 34 determines that branch A0 is taken (by, e.g., resolving the condition of branch A0 if it is a conditional branch), an entry in BTB 50 is allocated for branch A0. Therefore, another entry in BTB 50 is marked as valid by setting its valid field 52 to one. A3 or a value derived from A3 is stored in the tag field (since A3 is the address of branch A0). A0, which is the target of branch A0, is stored in the target address field, and a value of zero is stored in the wake field since a wake value has not yet been determined, i.e. predicted. Also, after execution branch A0, since prior branch register 95 includes a valid entry which stores information of the previous branch instruction (immediately preceding branch instruction, branch A2), wake calculator 96 can calculate a wake value for previous branch A2 (using the values in previous branch register 95 as illustrated in FIG. 9). Therefore, the calculated wake value is the address, A3, of the current branch instruction minus the target address, A2, of the previous branch instruction which is currently stored in target or sequential address field 91. (Note that the address, A3, of the current branch instruction corresponds to the value of fetch address 41, which is the current fetch address.) This calculated wake value ("A3–A2") is compared with the wake value for branch A2 stored in wake field 93, which is zero. Since "A3–A2" is not equal to zero, wake calculator 96 provides "A3–A2" as wake update value 98 to BTB 50 and an appropriate wake update index 100 (e.g. A1 or a value derived from A1 to match to the appropriate entry in BTB 50 or A0 to match the appropriate entry in wake table 84), such that the wake field within the entry in BTB 50 for branch A2 can be updated, as shown in FIG. 10, with the new wake value "A3–A2". Also, previous branch register 95 is now updated with the information of branch A0, as shown in FIG. 10.

Therefore, the next time a fetch address hits in BTB 50 matching tag field A1 and it is predicted taken, A2 will be provided as the target address, and wake counter 47 will be set to the value "A3–A2" such that branch predictor 48 can be disabled for the next wake number ("A3–A2") of fetches. For example, looking at the code segment of FIG. 7, the fetches which occur for inst 20 through inst 29 are likely to not include a branch instruction during a next iteration of the loop, and therefore, branch predictor 48 can be disabled or placed in a low power mode for the "A3–A2" number of fetches which occur starting with inst 20 through inst 29.

FIG. 11 illustrates the state of previous branch register 95 and BTB 50 after executing branch A2 for a second time. In this case, branch A2 hit in BTB 50, thus an entry in BTB 50 is already allocated for branch A2. Since previous branch register 95 includes a valid entry, wake calculator 96 can calculate a wake value for branch A0 (using the values of previous branch register 95 illustrated in FIG. 10). This wake value ends up being "A1–A0" since A1 is the address of the current branch instruction (branch A2) and A0 is the address of the target instruction of the previous branch instruction (branch A0). Since this value is different from the wake value of the previous branch instruction (which is zero), the entry for branch A0 in BTB 50 is updated with the new wake value ("A1–A0") as was discussed above via wake updated signals 66. Also, previous branch register 95 is updated with the information for branch A2 as shown in FIG. 11, where note now that the wake value for branch A2 which gets stored into wake field 92 of previous branch register 95 is "A3–A2."

FIG. 12 illustrates the state of previous branch register 95 and BTB 50 after executing branch A0 for the second time. A new wake value is calculated for branch A2 this second time to determine if its wake value needs to be updated. The calculated wake value for branch A2 at this point is "A3–A2". However, note that this calculated wake value is equal to the wake value already stored with branch A2 (where this information is provided by wake field 92 of previous branch register 95, as illustrated in FIG. 11); therefore, no updating of BTB 50 or wake table 84 is needed. As illustrated in FIG. 12, previous branch register 95 is then updated with the information for branch A0, where note now that the wake value for branch A0 which gets stored into wake field 92 of previous branch register 95 is "A1–A0."

FIG. 13 illustrates the state of previous branch registers 95 and BTB 50 after executing branch A2 for the third time. A new wake value is calculated for branch A0 this third time to determine if its wake value needs to be updated. The calculated wake value for branch A0 at this point is "A1–A0". However, note that this calculated wake value is equal to the wake value already stored with branch A0 (where this information is provided by wake field 92 of previous branch register 95, as illustrated in FIG. 12); therefore, no updated of BTB 50 or wake table 84 is needed. As illustrated in FIG. 13, previous branch register 95 is then updated with the information for branch A2, where the wake value remains "A3–A2" for branch A2.

Therefore, in this manner, according to the illustrated example, each time a branch is taken, a wake value is calculated for the immediately preceding branch (whose information is stored in previous branch register 95) and a determination is made as to whether or not an update of BTB 50 (or of wake table 84) is needed. Previous branch register 95 is then updated with the current take branch which becomes the immediately preceding taken branch for the next taken branch instruction.

Note that the wake numbers stored in BTB 50 or wake table 84 are predictions of when fetches of non-branch instructions will occur. That is, note that a particular wake value, as was described above, for a taken branch instruction (one that is currently stored in previous branch register 95) is determined each time a branch subsequent to that taken branch is taken. Note that, in one embodiment, the branch subsequent to the taken branch need not be taken, it just needs to be predicted, i.e. hit in BTB 50. If the allocation policy for BTB 50 requires the branch to be taken, then the first update of a wake value for the branch in previous branch register 95 will occur when the subsequent branch is first taken and allocated. But later, that subsequent branch may be predicted not-taken, e.g. a BTB hit and predicted not taken. Therefore, in one embodiment, the wake value for the previous branch can still be such that the predictor is powered up for a BTB hit on the subsequent branch, even if the subsequent branch is predicted not taken.

This wake number (whether it is updated or not depending on comparing the calculated wake value with the current wake value), is a prediction that during a subsequent execution of that segment of code, that wake number of fetches will not include a branch instruction. If it turns out that the wake number was mispredicted for a particular taken branch instruction, because, for example, a taken branch was mispredicted (e.g. it turns out it is actually not taken), the true branch outcome will be resolved by branch execution unit 34, and the misprediction will be handled accordingly. Furthermore, the appropriate BTB entry can be updated (e.g. invalidated), and the wake values will be corrected accordingly. On a misprediction, the proper branch prediction structures are corrected. Updates or corrections include, but are not limited to, data fields within BTB 50 (e.g., target address field, wake field, etc.), fields in the direction predictor (e.g., taken/not taken field), or fields in any other auxiliary structure used to predict the next fetch address. In some embodiments of a branch predictor, a misprediction operates in much the same way as branch allocation with the caveat that an existing entry is modified (or updated) instead of being initialized. Under certain conditions, a misprediction entails more than just correcting an entry and might require the invalidation of an entry altogether. This occurs but is not necessarily limited to the case when a non-branch instruction incorrectly hits in the branch predictor and is incorrectly predicted as taken or not taken. In such a case, the mispredicting entry in the branch predictor is marked invalid (i.e., the valid bit is deasserted) instead of performing updates or corrections to fields of the entry within the branch predictor structures.

Note that, in the illustrated embodiment, wake values are only calculated and updated, if necessary, in response to taken branches. However, as described above, a similar procedure may be used for all branches, including taken and not taken branches, where a previous branch register can be used to also store information for a previous not taken branch (in which the direction field would be set to "0" to indicate not taken.) Therefore, in one embodiment, two registers similar to previous branch register 95, may be used in wake update circuitry 35 where a first register corresponds to the previous taken branch and the a second register to the previous not taken branch.

Therefore, by now it can be understood how a wake value can be used in conjunction with branch prediction to conserve power by disabling a branch predictor when it is predicted that branches requiring prediction will not appear in subsequent fetches. That is, in one embodiment, the use of wake prediction 72, wake update circuitry 35, and wake counter 47 are used as a branch prediction predictor which allows fetch unit control circuitry 46 to "predict" when branch prediction is not necessary and thus disable the branch predictor (or place the branch predictor into a low power mode).

In one embodiment, a method includes providing a processor where the processor includes a fetch unit and a branch execution unit, where the fetch unit includes a branch predictor, and where the branch predictor includes a branch target buffer and a branch direction predictor; predicting a wake number that is a number of instruction fetches performed after a fetch of a first branch; and enabling a low power mode of the branch predictor for a duration of the wake number in response to a hit in the branch target buffer in response to the first branch.

In a further embodiment, enabling the low power mode includes disabling clocks.

In another further embodiment, enabling the low power mode includes disabling read enables.

In another further embodiment, enabling the low power mode includes removing power from at least a portion of the branch predictor.

In another further embodiment, providing is further characterized by the branch target buffer including a memory, where the memory has a plurality of entries, and where in each entry has a valid field, a TAG field, a target address field, and a wake field. In a yet further embodiment, providing is further characterized by the wake field storing a wake number corresponding to a branch corresponding to an address in the TAG field.

In another further embodiment, providing is further characterized by the branch predictor further including a wake table and the branch target buffer including a memory coupled to the wake table. In a yet further embodiment, providing is further characterized by the wake table storing the wake number at an index of a fetch address that immediately follows the fetch address of the first branch.

In another further embodiment, predicting the wake number is further characterized by subtracting an address of a target of the first branch from an address of a second branch, in which no branches occur between the first branch and the second branch. In a yet further embodiment, predicting the wake number further includes providing a previous branch register for storing the address of the first branch during execution of the first branch and storing the address of the second branch in response to execution of the second branch.

In another embodiment, a method includes providing a processor having a branch predictor, where the branch predictor includes a branch target buffer, the branch target buffer stores target addresses of branches, and the branch predictor has a low power mode; storing a wake number in the branch predictor corresponding to a predicted number of fetches between a first branch and an immediately following branch; and enabling the low power mode of the branch target buffer for the wake number of fetches in response to the branch target buffer have a hit in response to the first branch.

In a further embodiment of the another embodiment, the method further includes calculating the wake number based on a next fetch address immediately following an address of the first branch and an address of the immediately following branch. In a yet further embodiment, enabling the low power mode is further characterized by the low power mode disabling clocks to the branch predictor. In another yet further embodiment, providing is further characterized by the branch target buffer including a memory, wherein the memory contains the wake number. In another yet further embodiment, providing is further characterized by the branch target buffer including a memory, the branch predictor further including a wake table, and the wake table containing the wake number.

In yet another embodiment, a processor includes a fetch unit including a branch predictor having a branch target buffer that stores target addresses of branches, where the branch predictor stores a plurality of wake values; each wake value is representative of a predicted number of fetches between a branch and an immediately following branch; the branch predictor has a low power mode that is enabled in response to a hit in the branch target buffer caused by a branch; and the low power mode is for a duration of a wake value of the plurality of wake numbers that corresponds to the branch that caused the hit. The processor also includes a branch execution unit coupled to the fetch unit.

In a further embodiment of the yet another embodiment, the branch target buffer includes a memory that stores the plurality of wake values, In another further embodiment of the yet another embodiment, the branch predictor further includes a wake table, coupled to the branch target buffer, that stores the plurality of wake values.

In another further embodiment of the yet another embodiment, the branch execution unit is further characterized as providing the plurality of wake values to the branch predictor by calculating a difference in addresses between a target of a branch and an immediately following branch. In a yet further embodiment, the low power mode is characterized as disabling clocks of the branch predictor.

In the foregoing specification, the invention has been described with reference to specific embodiments. However, one of ordinary skill in the art appreciates that various modifications and changes can be made without departing from the scope of the present invention as set forth in the claims below. For example, the block diagrams may include different blocks than those illustrated and may have more or less blocks or be arranged differently. Also, the flow diagrams may also be arranged differently, include more or less steps, or may have steps that can be separated into multiple steps or steps that can be performed simultaneously with one another. It should also be understood that all circuitry described herein may be implemented either in silicon or another semiconductor material or alternatively by software code representation of silicon or another semiconductor material. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
    providing a processor wherein the processor comprises a fetch unit and a branch execution unit, wherein the fetch unit comprises a branch predictor, wherein the branch predictor comprises a wake table, a branch target buffer, and a branch direction predictor, wherein the branch target buffer comprises a memory coupled to the wake table;
    predicting a wake number that is a number of instruction fetches performed after a fetch of a first branch, wherein the wake table stores the wake number at an index of a fetch address that immediately follows a fetch address of the first branch; and
    enabling a low power mode of the branch predictor for a duration of the wake number in response to a hit in the branch target buffer in response to the first branch.

2. The method of claim 1, wherein the step of enabling the low power mode comprises disabling read enables.

3. The method of claim 1, wherein the step of providing comprises:
    providing the processor wherein the processor comprises the fetch unit and the branch execution unit, wherein the fetch unit comprises the branch predictor, wherein the branch predictor comprises the branch target buffer and the branch direction predictor, wherein the memory has a plurality of entries, wherein each entry has a valid field, a TAG field, and a target address field.

4. The method of claim 1, wherein the step of predicting the wake number is further characterized by subtracting an address of a target of the first branch from an address of a second branch, in which no branches occur between the first branch and the second branch.

5. The method of claim 4, wherein the step of predicting the wake number further comprises providing a previous branch register for storing the address of the first branch during execution of the first branch and storing the address of the second branch in response to execution of the second branch.

6. A method, comprising:
    providing a processor having a branch predictor, wherein the branch predictor comprises a branch target buffer and a wake table, the branch target buffer stores target addresses of branches, and the branch predictor has a low power mode;
    storing a wake number in the wake table corresponding to a predicted number of fetches between a first branch and an immediately following branch, wherein the wake number is stored in the wake table at an index of a fetch address that immediately follows a fetch address of the first branch; and
    enabling the low power mode of the branch target buffer for the wake number of fetches in response to the branch target buffer have a hit in response to the first branch.

7. The method of claim 6, further comprising calculating the wake number based on a next fetch address immediately following an address of the first branch and an address of the immediately following branch.

8. The method of claim 7, wherein the step of providing comprises:
    providing the processor having the branch predictor, wherein the branch predictor comprises the branch target buffer, the branch target buffer stores target addresses of branches, and the branch predictor has a low power mode, wherein the branch target buffer comprises a memory coupled to the wake table, wherein the memory stores the target addresses of branches.

9. A processor comprising:
    a fetch unit, implemented at least partially in hardware, comprising:
        a branch predictor having a branch target buffer that stores target addresses of branches and having a wake table coupled to the branch target buffer that stores a plurality of wake values, wherein:
            each wake value is representative of a predicted number of fetches between a corresponding branch and an immediately following branch and each wake value is stored in the wake table at an index of a fetch address that immediately follows a fetch address of the corresponding branch,
            the branch predictor has a low power mode that is enabled in response to a hit in the branch target buffer caused by a branch; and
            the low power mode is for a duration of a wake value of the plurality of wake numbers that corresponds to the branch that caused the hit;
    a branch execution unit, implemented at least partially in hardware, coupled to the fetch unit.

10. The processor of claim 9, wherein the branch execution unit provides the plurality of wake values to the branch predictor by calculating a difference in addresses between a target of a branch and an immediately following branch.

* * * * *